(12) United States Patent
Kelly et al.

(10) Patent No.: US 11,002,459 B2
(45) Date of Patent: May 11, 2021

(54) CONTROL DEVICE AND OPERATING METHOD FOR AIR TREATMENT APPARATUSES

(71) Applicant: KONINKLIJKE PHILIPS N.V., Eindhoven (NL)

(72) Inventors: Declan Patrick Kelly, Shanghai (CN); John Robert McGarva, Newton Stewart (GB); Xiao-Ming Zhou, Shanghai (CN); Hongyi Zheng, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 144 days.

(21) Appl. No.: 16/348,882

(22) PCT Filed: Nov. 9, 2017

(86) PCT No.: PCT/EP2017/078692
§ 371 (c)(1),
(2) Date: May 10, 2019

(87) PCT Pub. No.: WO2018/091340
PCT Pub. Date: May 24, 2018

(65) Prior Publication Data
US 2020/0182503 A1    Jun. 11, 2020

(30) Foreign Application Priority Data

Nov. 16, 2016  (WO) ................ PCT/CN2016/000639
Jan. 12, 2017  (EP) ................... 17151108.2

(51) Int. Cl.
*F24F 11/64*    (2018.01)
*F24F 11/77*    (2018.01)
(Continued)

(52) U.S. Cl.
CPC ............. *F24F 11/64* (2018.01); *F24F 11/65* (2018.01); *F24F 11/77* (2018.01); *F24F 2110/64* (2018.01)

(58) Field of Classification Search
CPC .. F24F 11/30; F24F 11/64; F24F 11/65; F24F 11/77; F24F 2110/50; F24F 2110/64;
(Continued)

(56) References Cited

U.S. PATENT DOCUMENTS 5,334,248 A    8/1994  Kwak
6,494,940 B1   12/2002 Hak
(Continued)

FOREIGN PATENT DOCUMENTS

CN    102901180 A    1/2013
CN    103471202      12/2013
(Continued)

OTHER PUBLICATIONS

ISO 7708:1995 "Air quality—Particle size fraction definitions for health-related sampling".
(Continued)

*Primary Examiner* — Kidest Bahta

(57) ABSTRACT

The present disclosure relates to a method and a control device (100) for operating an air treatment apparatus (10), the control device (100) comprising an input (102) arranged to receive measured data that is indicative of particle concentration from a sensing unit (130), a baseline processing module (104) arranged to derive particle concentration indicative information from the received measured data, an obtaining module (106) arranged to obtain augmenting information that is indicative of air quality, an air quality index augmenting module (108) arranged to determine an augmented air quality index based on the particle concentration indicative information and the augmenting informa-
(Continued)

tion, and an operation control module (110) arranged to operate the air treatment apparatus (10) based on the augmented air quality index. The disclosure further relates to a corresponding computer program.

20 Claims, 6 Drawing Sheets

(51) Int. Cl.
 *F24F 11/65* (2018.01)
 *F24F 110/64* (2018.01)
(58) Field of Classification Search
 CPC .......... F24F 2011/0023; F24F 11/0017; F24F 11/0086; Y02B 30/70; G01N 33/0034
 See application file for complete search history.

(56) References Cited

U.S. PATENT DOCUMENTS

| | | | |
|---|---|---|---|
| 6,711,470 B1* | 3/2004 | Hartenstein | F24F 11/30 700/276 |
| 7,725,268 B2 | 5/2010 | Appelo | |
| 2002/0144537 A1* | 10/2002 | Sharp | G01N 33/0034 73/31.01 |
| 2008/0182506 A1 | 7/2008 | Jackson | |
| 2009/0053989 A1 | 2/2009 | Lunde | |
| 2015/0032264 A1* | 1/2015 | Emmons | F24F 11/62 700/276 |
| 2015/0052975 A1 | 2/2015 | Martin | |
| 2016/0318368 A1 | 11/2016 | Alger | |
| 2017/0328591 A1* | 11/2017 | Kelly | B01D 46/46 |

FOREIGN PATENT DOCUMENTS

| | | |
|---|---|---|
| CN | 104515276 | 4/2015 |
| JP | 04116209 | 7/2008 |
| KR | 2005109819 | 11/2005 |
| WO | 2014/207629 | 12/2014 |
| WO | 2016/102510 | 6/2016 |

OTHER PUBLICATIONS

International Search Report and Written Opinion dated Jan. 16, 2018 for International Application No. PCT/EP2017/078692, filed Nov. 9, 2017.

* cited by examiner

CONTROL DEVICE AND OPERATING METHOD FOR AIR TREATMENT APPARATUSES

CROSS REFERENCE TO RELATED APPLICATIONS

This application is the U.S. National Phase application under 35 U.S.C. § 371 of International Application No. PCT/EP2017/078692 filed Nov. 9, 2017, published as WO2018/091340 on May 24, 2018, which claims the benefit of European Patent Application Number 17151108.2 filed Jan. 12, 2017 and Application Number PCT/CN2016/000639 filed Nov. 16, 2016. These applications are hereby incorporated by reference herein.

FIELD OF THE INVENTION

The present disclosure relates to the field of air treatment apparatuses and to respective control devices. The present disclosure further relates to a method of operating an air treatment apparatus and to a corresponding computer program.

In some specific embodiments, the present invention relates to home appliances that are arranged for treatment of ambient air in buildings, so as to improve a sense of well-being of the present residents. More particularly, the disclosure relates to improvements in air treatment apparatuses, particularly air purifying apparatuses, and in related operation methods that enhance a purifying performance.

In a more general context, the present disclosure relates to improvements in home automation and building automation, with the main focus on air purifying, particularly indoor air purifying.

Further, in some specific embodiments, the disclosure relates to operating methods and devices for treatment apparatuses that tackle allergens and further pollutants that may cause health problems and discomfort for allergy sufferers.

BACKGROUND OF THE INVENTION

WO 2016/102510 A1 discloses an air quality-monitoring system which may include at least one sensor configured to detect operation of a mechanism within or at a boundary of an indoor environment. The mechanism may be external to an air purifier associated with the indoor environment. The system may include a persistent memory for storing data about the indoor environment observed by the at least one sensor. A controller may be communicatively coupled with the at least one sensor and configured to: assemble the data into an air quality profile associated with that environment; determine, based on a signal from the at least one sensor and on the air quality profile, a likelihood that operation of the mechanism will cause a measure of air quality within the indoor environment to fail one or more air quality criteria; and selectively provide, based on the likelihood, an indication that operation of the mechanism will cause the measure of air quality within the indoor environment to fail the one or more air quality criteria.

U.S. Pat. No. 6,494,940 B1 discloses an air purifier comprising a housing supporting an air inlet, an air outlet and an air flow passage interconnecting said air inlet and said air outlet, a blower assembly supported within said housing for forcing air through said air flow passage from said air inlet to said air outlet, a treatment light source disposed in said air flow passage and positioned proximate said air outlet, a filter arrangement disposed in said air flow passage, and an outlet grille supported by said housing proximate said air outlet, said outlet grille permeable to air.

WO 2014/207629 A1 discloses an air purifier and a controller for controlling an air purifier, the controller comprising a first obtaining module adapted to obtain a forecast of airborne injurants, a determination module adapted to determine an operation scheme of the air purifier according to said forecast of airborne injurants, and a purifier interface adapted to communicate with the air purifier and to transmit said operation scheme to the air purifier.

Air treatment apparatuses may be used in housing areas, but also in working areas, including offices, workshops, shops, etc. An air purifying apparatus is a device which is arranged to remove small particles and gaseous contaminants from the ambient air in a room. These devices are commonly considered as being beneficial to allergy sufferers and asthmatics. They may be also helpful in reducing or eliminating second-hand tobacco smoke, for instance, and similar small particle contaminants. Further fields of application may be envisaged.

Those appliances may be regarded as domestic appliances that improve the quality of the room air in buildings. Air purifying apparatuses may utilize, for instance, a set of filters to clean the room air. Further, air quality sensors may be provided. A ventilating unit may be provided that generates an air flow through the appliance. Regarding the purifying procedure, apart from filtering, further techniques may be utilized, for instance UV irradiators, thermodynamic sterilization, ozone generators, ionizers, etc.

Indoor air purification is an important topic for human health because nowadays people generally spend more than 80% of their time in houses, offices, and cars.

In allergen sufferers, relatively low levels of airborne allergens can trigger an allergic reaction. Airborne allergens may originate from outdoor sources (e.g. pollen, molds, etc.) and/or indoor sources (e.g. dust mites, animal hair, skin scales, mold, etc.). Further, apart from being present in the air, allergens settle on surfaces in the home and some allergens (from dust mites) originate on residential environment surfaces such as beds, floors, couches.

There is a demand for air purifiers and air treatment apparatuses that are capable of reducing the impact of allergens, which may involve a reduction of an allergen level in the ambient air. Accurate allergen sensors are not currently available. However, users still want feedback on allergen levels and a purifier that can smartly react to control the allergen levels and reduce the likelihood of an allergen reaction.

Furthermore, it has been observed that operating an air treatment apparatus sometimes is experienced as cumbersome and complicated. For instance, a main control value for the operation of air treatment apparatuses is a current concentration of particulate matter (PM) in ambient air. However, the nature and significance of PM concentration values (e.g. a $PM_{2.5}$ concentration) is sometimes hard to understand for unexperienced users. As a result, there is the risk that due to operator errors the air treatment apparatus cannot achieve the desired purifying performance.

Hence, there is still room for improvement in air treatment apparatuses and operating methods therefor.

SUMMARY OF THE INVENTION

It is an object of the present disclosure to provide a control device for enhanced control of an air treatment apparatus, and an air treatment apparatus that is arranged to be controlled in a smart fashion. Preferably, an air treatment apparatus that is controlled by a respective control device shows improved allergen removal performance and, consequently, is capable of improving a sense of well-being of allergen sufferers.

Preferably, the control device is arranged to autonomously operate the air treatment apparatus, which may involve a smart operation dependent on a current air quality level.

Preferably, the control device is provided with (or coupled to) sensory equipment substantially designed for particle concentration related measurements, wherein the control device preferably augments and/or supplements detected particle concentration information. Preferably, the control device is adapted to reduce an allergen level in the ambient air, in spite of not being equipped with and/or coupled to specific explicit allergen sensors.

There is a certain need for an augmented air treatment apparatus that can be manufactured in a cost-efficient fashion, and, at the same time, providing enhanced performance including improved features and novel operation modes. Preferably, the air treatment apparatus is arranged as a smart device that is operable in an on-demand (auto-mode operation) fashion, which enables a power efficient operation and ensures a desired air quality level.

In a first aspect of the present disclosure there is provided a control device for operating an air treatment apparatus, the control device comprising:

an input arranged to receive measured data that is indicative of particle concentration from a sensing unit, a baseline processing module arranged to derive particle concentration indicative information from the received measured data, an obtaining module arranged to obtain augmenting information that is indicative of air quality, an air quality index augmenting module arranged to determine an augmented air quality index based on the particle concentration indicative information and the augmenting information, and an operation control module arranged to operate the air treatment apparatus based on the augmented air quality index.

This aspect is based on the insight that the air treatment apparatus, in spite of not being equipped with an explicit allergen sensor, may be operated in a more efficient fashion when tackling allergen causing pollutants.

It has been observed that prediction accuracy and validity of particle concentration measurements is limited when allergens in the ambient air are addressed. Hence, an increased allergy risk level may be present even in cases when an overall particle concentration is below a standard threshold, e.g. a certain range or level of particulate matter concentration. Since typically a certain fraction of particulate matter may be allergenic, the current level of particulate matter concentration is sometimes not conclusive of an allergenic load.

In accordance with the present disclosure, an air treatment apparatus having considerably limited sensory capacity may provide additional operations modes and functions. Providing the air treatment apparatus with additional capabilities and features greatly improves the controllability and the overall air treatment performance, particularly the air purifying performance.

As a result, the appliance may be operated in an allergen mode. The operation mode may involve an auto-mode operation that detects and reacts to potential allergen risks, and auto-powers the airflow through the appliance to significantly reduce the allergen exposure.

Generally, the augmenting information may involve event-based information spanning a short-time or mid-term horizon to long-term information spanning a considerably long-time horizon. Further, the augmenting information may involve sudden changes and slow changes of a signal.

The obtaining module may be arranged, inter alia, to process particle measurements so as to derive augmenting information therefrom. This may involve that the obtaining module is arranged to further process particle concentration signals that are reflected in a baseline air quality index. Further, the obtaining module may be arranged to detect events that require an adaption of the current operation mode. In another exemplary embodiment, the obtaining module may be arranged to monitor and record operational data. Based on an operation record, augmenting information may be processed.

In accordance with the above-described aspect, the air treatment apparatus may be operated by the operation control module dependent on the augmented air quality index. The augmented air quality index is based on a non-augmented air quality index which is primarily established on the basis of the particle concentration. By applying augmenting and/or supplemental information, the air quality index may be modified so as to be even more indicative of an allergen level. By way of example, operating the air treatment apparatus may include a control of a throughput and/or a ventilator speed/fan speed.

The augmented air quality index may also be referred to as supplemented or enriched air quality index. Generally, in at least some embodiments as discussed herein, the augmented air quality index includes information about an estimated risk of airborne allergens.

In an exemplary embodiment of the control device, the particle concentration indicative information involves at least one of particulate matter information and ultrafine particle information, wherein the particle concentration indicative information defines a baseline of the air quality index, and wherein the augmenting information is used to adapt the air quality index.

As used herein, ultrafine particles (UFP) is particulate matter of nanoscale size (e.g. less than 100 nm in diameter). Further, particulate matter (PM) is a more generic term involving microscopic matter suspended in ambient atmosphere. Sources of particulate matter and ultrafine particles may generally be natural or man-made.

In accordance with exemplary embodiments of the present disclosure, different measurements and/or differently processed signals are combined in the augmented air quality index under one scale or representation. This involves that the augmented air quality index does not necessarily have to involve quantitative information, but rather qualitative information. This greatly improves ease of operation for a user.

In a further exemplary embodiment, the augmenting information is indicative of short term or medium term events. This may include so-called micro events are frequently overlooked in conventional measurement and control approaches. It has been observed that extra ordinary short term or medium term events are often indicative of a sudden increase in the pollutant level and, consequently, in the allergen level.

Generally, so as to provide a relatively stable control procedure for the operation of the air treatment apparatus, the signal on which a conventional air quality index is based is an averaged signal. To this end, a moving average may be applied. However, it has been detected that the moving average smoothens or even filters out potentially indicative information, particularly micro events that are happening in a short term or a medium term scale.

In a further exemplary embodiment, the augmenting information involves at least one of the following:
 a temporal change of particle concentration,
 an operating record of the air treatment apparatus, and
 an actual operating performance of the air treatment apparatus.

It is to be noted that the above listing is not necessarily exclusive. Further, combinations of two or more influencing characteristics may be used.

A temporal change of particle concentration may include a sudden particle concentration increase. Such an event may be for instance indicative of an opened window, vacuum cleaning, shaking the bedding, and similar events that potentially include a sudden increase in allergens in the ambient air.

The operating record or operating history of the air treatment apparatus may for instance include temporal information such as the elapsed time since the last purification and/or a certain operation mode of the apparatus. For instance, in a rather simple example, if it has been detected that the ambient air has not been purified or only purified at a relatively low setting for a certain time period, it may be concluded that the risk of airborne allergens increases.

Further, an actual operating performance may for instance include an actual effectiveness level. For instance, it may be detected that a high performance setting of the air treatment apparatus does not result in an expected reduction of the particle concentration of the ambient air. If this is the case, it may be concluded that the present particle concentration is really high, and/or that adverse influences are present. Adverse influences may for instance include blocked filters, an opened window or door, a poor placement of the apparatus (e.g., inlet and/or outlet relatively close to walls and/or furniture), the presence of particulate generating and/or swirling activities, etc.

Depending on the detected augmenting information, the operation control module may apply a certain appropriate operation mode, which would not have been used in case the control of the air treatment apparatus was merely based on a non-augmented air quality index.

In a further exemplary embodiment, the air quality index is a discrete, qualitative index, comprising a signal that may assume a limited number of discrete values. For instance, a limited range of twelve discrete values/states may be defined. For instance, in terms of particle concentration, each of the discrete values may cover a certain range thereof. When an extraordinary event is detected, a respective modification of the air quality index signal may follow.

Hence, a baseline of the air quality index and, accordingly, a base discrete index signal may be augmented and adapted by additional information.

Further, in still another exemplary embodiment, a limited number of main air quality states is assigned to the values of the augmented air quality index signal. By way of example, a color system similar to a traffic light system may be used to indicate a limited number of main states of a relatively low/medium/high pollutant level.

It has been detected that many users of air treatment apparatuses, particularly non-experienced home users, are overwhelmed by and/or unable to cope with fine-staggered, basically analog or nearly-analog signals. Further, as in accordance with major aspects of the present disclosure the air quality index is not only based on particle concentration information, but also on augmenting information, a simplified representation and handling of the air quality index signal reflects the potentially non-dimensional qualitative but non-quantitative characteristics of the index signal even better.

In accordance with a further exemplary embodiment, the device further comprises an output unit that is arranged to indicate at least one of a current level of the air quality index and a current main air quality state. The output unit may involve or may be arranged to be coupled with a display and similar devices. Further, the control device may be operatively coupled with remote devices, such as hand held terminal devices, mobile phones, tablets, etc. Hence, also a remote display may be used to indicate a current level or a current main state of the air quality index. The output and the input may use one and the same interface.

In accordance with yet a further exemplary embodiment, the air quality index augmenting module is arranged to adapt the air quality index based on the augmenting information, wherein the adaption involves applying an offset to a particle concentration indicative signal. As a result, for instance in reaction to certain short term or medium term events, a pseudo concentration may be applied so as to control the air treatment apparatus accordingly. Hence, an even larger particle concentration may be simulated so as to prompt the operation control module to operate the air treatment apparatus in a desired mode of operation.

Generally, an absolute and/or relative offset may be applied to a currently detected particle concentration measurement. As a result, extraordinary events and/or further non-standard conditions may be reflected in the particle concentration indicative signal which involves a baseline and a respective augmenting share.

In yet another exemplary embodiment, the applied offset is gradually reduced after the adaption of the air quality index. Eventually, the original air quality index level that is primarily based on the detected particle concentration is restored. With this measure, a temporary (time-limited) effect of a certain event can be reflected in the resulting augmented air quality index.

Generally, when an event is detected and a respective adaption of the air quality index is present, a specific treatment of potential further events may be defined. In this way, occurrences that basically belong to one and the same event or to a related group of events may be considered and handled.

In yet another exemplary embodiment, the air quality index is, based on the augmenting information, altered by the air quality index augmenting module by applying a modified artificial particle concentration level, taking account of augmenting information that is indicative of short term or mid term air quality influencing factors.

Hence, based on basically multi-dimensional information, a single, easy-to-handle, but rather revealing signal may be established based on which the air treatment apparatus may be operated.

In an exemplary embodiment, the particle concentration indicative information is processed, involving averaging a particle concentration signal based on a first averaging window, averaging the particle concentration signal based on a second averaging window, wherein the first averaging window is smaller than the second averaging window, and calculating a ratio between the first averaged signal and the second averaged signal, resulting in a signal that forms a basis for the detection of events that trigger a modification of a baseline air quality index. Hence, based on one and the same particle concentration signal, two averaged signals are simultaneously formed. It has been found that events that are potentially indicative of an increased allergy risk are somewhat highlighted and accentuated in the resulting ratio, which simplifies the computation of the augmented air quality index. Similar signal conditioning measures may be envisaged.

In yet another exemplary embodiment of the control device, the input is coupled with at least one air quality sensor. In some embodiments, the sensor is arranged as a particulate matter (PM) sensor and/or a particle concentration sensor. Needless to say, also a set of sensors belonging to the same or a different type of sensor may be used.

Preferably, in at least some embodiments, the control device is not coupled to a specific allergen sensor, but is arranged to provide an improved allergen removal performance of the air treatment apparatus.

In a further exemplary embodiment of the air treatment apparatus, the air quality sensor is arranged as a particulate matter (PM) sensor arranged to detect a particulate matter indicative property and to signal a characterizing particulate matter value to the control unit based on which the second air quality value is computed, wherein the control unit is arranged to process the particulate matter value.

In indoor air treatment apparatuses, generally the presence, composition and/or concentration of PM in ambient air may be important variables for the control of the air purifying procedure. For instance, a so-called $PM_{2.5}$ concentration may be detected and used to activate, deactivate and to control the air treatment module. Hence, the air quality sensor for the first air quality property may be arranged as a $PM_{2.5}$ concentration sensor. As used herein, $PM_{2.5}$ shall refer to particles having a diameter of less than 2.5 micrometers.

In a more explicit non-limiting embodiment, the term $PM_{2.5}$ refers to particles which pass through a size-selective inlet with a 50% efficiency cut-off at 2.5 μm (micrometer) aerodynamic diameter. For definition purposes, and not for limiting the scope, reference is made to ISO 7708:1995 "Air quality—Particle size fraction definitions for health-related sampling".

Further, in some further exemplary embodiments, a $PM_{10}$ concentration may be a value of interest. As used herein, $PM_{10}$ shall refer to particles which pass through a size-selective inlet with a 50% efficiency cut-off at 10 μm (micrometer) aerodynamic diameter.

In a further aspect of the present disclosure, an air treatment apparatus is presented that is arranged to be coupled with a control device in accordance with at least one embodiment as discussed herein. In the alternative, an air treatment apparatus is presented that comprises a control device in accordance with at least one embodiment as discussed here. Hence, the control device may be arranged as a separate controller box that is coupled with the air treatment apparatus. In the alternative, the control device may be arranged as an integrated control device.

In a more specific context, an air treatment apparatus is presented that comprises:
an inlet for inlet air,
an outlet for outlet air,
air treatment module disposed between the inlet and the outlet, the air treatment module comprising a ventilating unit arranged to generate an air flow from the inlet to the outlet, and an air treatment unit arranged to apply a purifying treatment to the air flow,
a control device arranged to control the air treatment module, and
a sensor unit operatively coupled with the control unit, wherein the sensor unit comprises at least one air quality sensor,
wherein the control device is arranged in accordance with at least one embodiment as discussed herein.

In yet a further aspect of the present disclosure, a method of operating an air treatment apparatus is presented, the method comprising the following steps:
detecting particle concentration and deriving particle concentration indicative information,
obtaining augmenting information that is indicative of air quality,
determining an augmented air quality index based on the particle concentration indicative information and the augmenting information, and
operating the air treatment apparatus based on the augmented air quality index.

In an exemplary embodiment, the step of operating the air treatment apparatus involves setting an operation mode of the air treatment apparatus based on the augmented air quality index.

In a further exemplary embodiment of the method, the particle concentration indicative information involves at least one of particulate matter information and ultrafine particle information, wherein the particle concentration indicative information defines a baseline of the air quality index, wherein the augmenting information is used to adapt the air quality index, and wherein the augmenting information involves at least one of the following:
a temporal change of particle concentration,
an operating record of the air treatment apparatus, and
an actual operating performance of the air treatment apparatus.

In yet a further exemplary embodiment of the method, a baseline air quality index is computed based on the particle concentration indicative information, wherein the air quality index is adapted based on the augmenting information, and wherein the adaption involves applying an offset to a particle concentration indicative signal.

In still another aspect of the present disclosure there is presented a computer program comprising program code means for causing a computing device to carry out the steps of the method in accordance with at least one embodiment as discussed herein, when said computer program is carried out on a computing device.

In yet a further aspect of the present disclosure there is presented a computer program comprising program code means for causing a computing device to carry out the steps of the method in accordance with at least one embodiment as described herein, when said computer program is carried out on a computing device.

In yet further aspect of the present disclosure there is presented a computer-readable storage medium comprising instructions which, when executed by a computer, cause the computer to carry out the steps of the method in accordance with at least one embodiment as described herein.

As used herein, the term "computing device" may stand for a large variety of processing devices. In other words, also mobile devices having a considerable computing capacity can be referred to as computing device, even though they provide less processing power resources than standard "computers". Needless to say, such a "computing device" can be a part of an air treatment device and/or system. Furthermore, the term "computing device" may also refer to a distributed computing arrangement which may involve or make use of computing capacity provided in a cloud environment. The term "computing device" may also relate to control devices in general that are capable of processing data.

In an exemplary embodiment, the computer program is, at least in part, executed on a mobile computing appliance, particularly a mobile phone, a mobile computer and/or a tablet computer. Preferably, the mobile computing appliance is arranged to be operatively coupled with the air treatment apparatus and with a remote service, such as a server.

Preferred embodiments of the disclosure are defined in the dependent claims. It should be understood that the claimed method and the claimed computer program can have similar preferred embodiments as the claimed apparatus/system and as defined in the dependent device claims.

BRIEF DESCRIPTION OF THE DRAWINGS

These and other aspects of the invention will be apparent from and elucidated with reference to the embodiments described hereinafter. In the following drawings

DETAILED DESCRIPTION OF THE INVENTION

Figure 1:
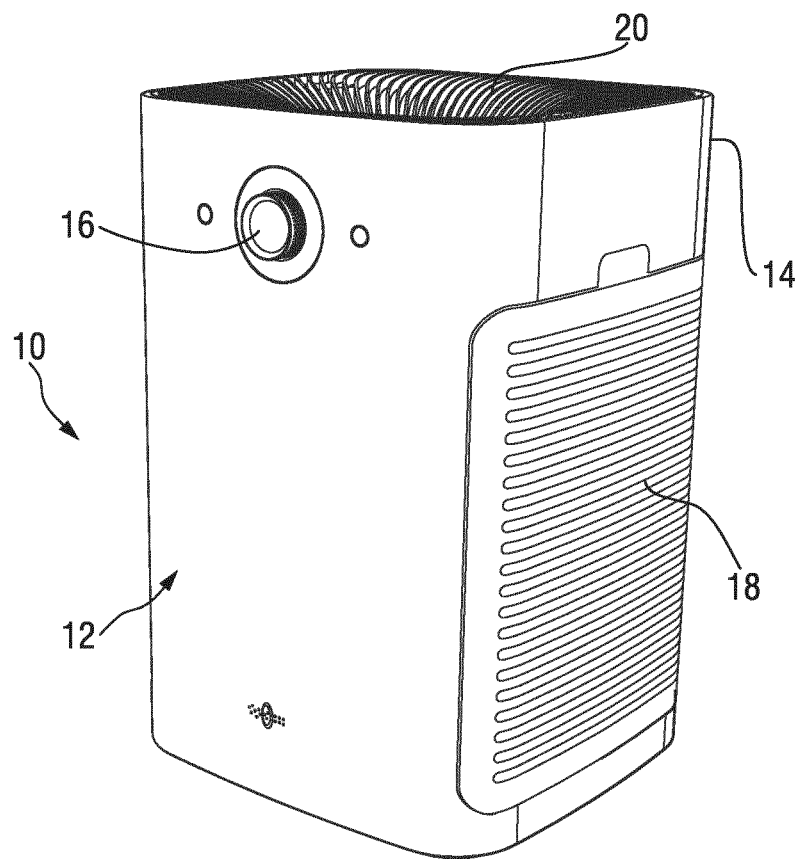
FIG. 1 shows a perspective view of an air treatment apparatus that is arranged as an air purifying apparatus.
Figure 2:
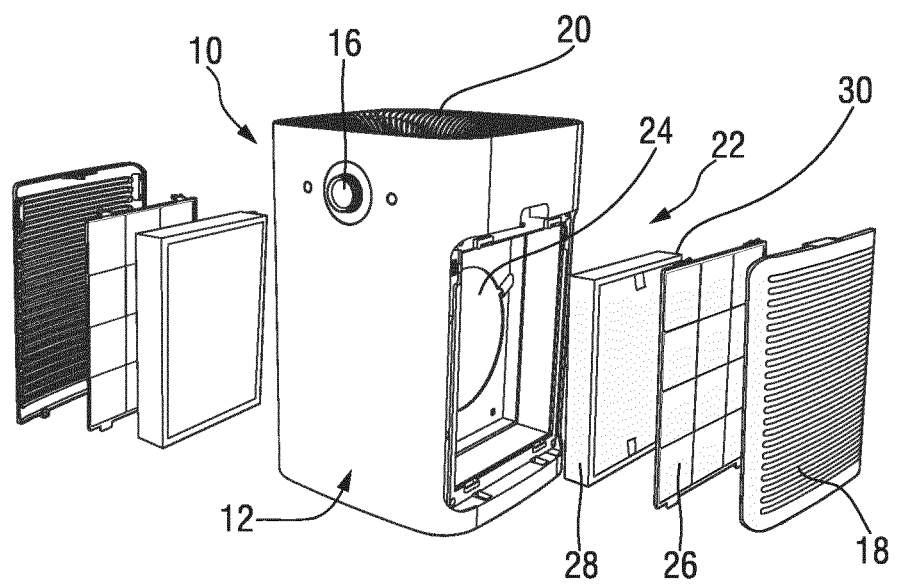
FIG. 2 shows a further perspective view of the apparatus of FIG. 1 in a partially exploded state.

FIG. 1 shows a perspective view of an air treatment apparatus that is designated by reference numeral 10. The apparatus 10 is arranged as an air purifying apparatus. FIG. 2 shows a corresponding partially exploded view of the apparatus 10, wherein the views of FIG. 1 and FIG. 2 use a similar view orientation but different scale ratios.

The apparatus 10 comprises a main housing or overall housing 12. The housing 12, at least in accordance with the embodiment shown in FIG. 1 and FIG. 2, comprises a nearly rectangular or square-shaped base area and extends upwardly. Overall, the housing 12 of the apparatus 10 defines a basically cuboid shape. Needless to say, at least slightly curved (convexly or concavely curved) walls may be present. Further, rounded and/or chamfered edges may be present.

Figure 3:
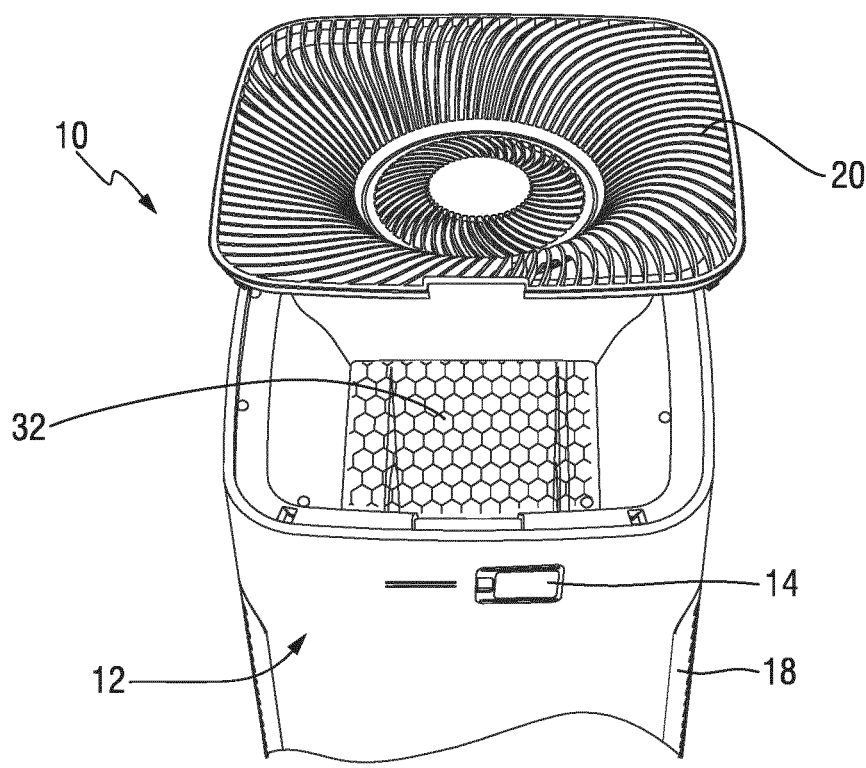
FIG. 3 shows a perspective rear end top view of the apparatus of FIG. 1 and FIG. 2, wherein an outlet cover that is arranged as a top grille is partially removed from a top end of a housing of the apparatus.

The apparatus 10 further comprises an air quality sensor 14, refer also to the perspective rear top view of FIG. 3. The air quality sensor 14 is arranged to detect an air property. The air quality sensor 14 may be capable of monitoring inlet air and/or outlet air. In accordance with certain embodiments, the air quality sensor 14 is arranged as a particulate matter (PM) sensor that sensor a PM concentration.

The apparatus 10 further comprises a user interface 16 which may comprise appropriate controls, keys, switches, indicators, LEDs, displays, etc.

In accordance with the arrangement of the exemplary embodiment illustrated in connection with FIG. 1 and FIG. 2, the apparatus 10 comprises two opposite lateral inlets that are covered by inlet covers 18 which are arranged as grilles. Further, the apparatus 10 comprises an outlet cover 20 at a top side thereof, wherein the outlet cover 20 is arranged as a grille. The outlet cover 20 may be also referred to as top grille or outlet grille.

The air purifying apparatus 10 comprises an air treatment module 22 which may be arranged as an air purification module. The air treatment module 22 comprise filters 26, 28 that are assigned to an air treatment unit 30. As shown in FIG. 2, a first type of filters 26 and a second type of filters 28 may be present at the air treatment unit 30. For instance, the filter 26 may be arranged as a pre-filter. Further, the filter 28 may be arranged as a fine-filter. The filters 26, 28 are arranged to filter an inlet air flow that enters the apparatus 10 through the inlet covers 18. Hence, an inlet air flow is a basically lateral flow. Further, an outlet air flow is a basically upwardly directed flow. The air treatment unit 30 is, in a fluidic view, interposed between the inlet and the outlet of the apparatus 10.

Needless to say, there may be different operating principles for air treatment units which may involve, for instance, thermodynamic sterilization, ultraviolet irradiation, photocatalytic oxidation, high-efficiency particulate arresting (HEPA) filtering, ionizer purifiers, ozone generators, and combinations thereof.

The apparatus 10 further comprises a ventilating unit which is indicated in FIG. 2 by reference numeral 24. In accordance with the exemplary embodiment of FIG. 2, the ventilating unit 24 is arranged in an interior of the housing 12 between two opposite units of inlet filters 26, 28.

FIG. 3 shows a perspective rear top view of the arrangement of FIGS. 1 and 2. The side of the housing 12 where at least one air quality sensor of the air quality sensor 14 is arranged is opposite from the side of the housing 12 where the user controls 16 are arranged. However, this exemplary arrangement shall not be construed in a limiting sense.

Figure 4:
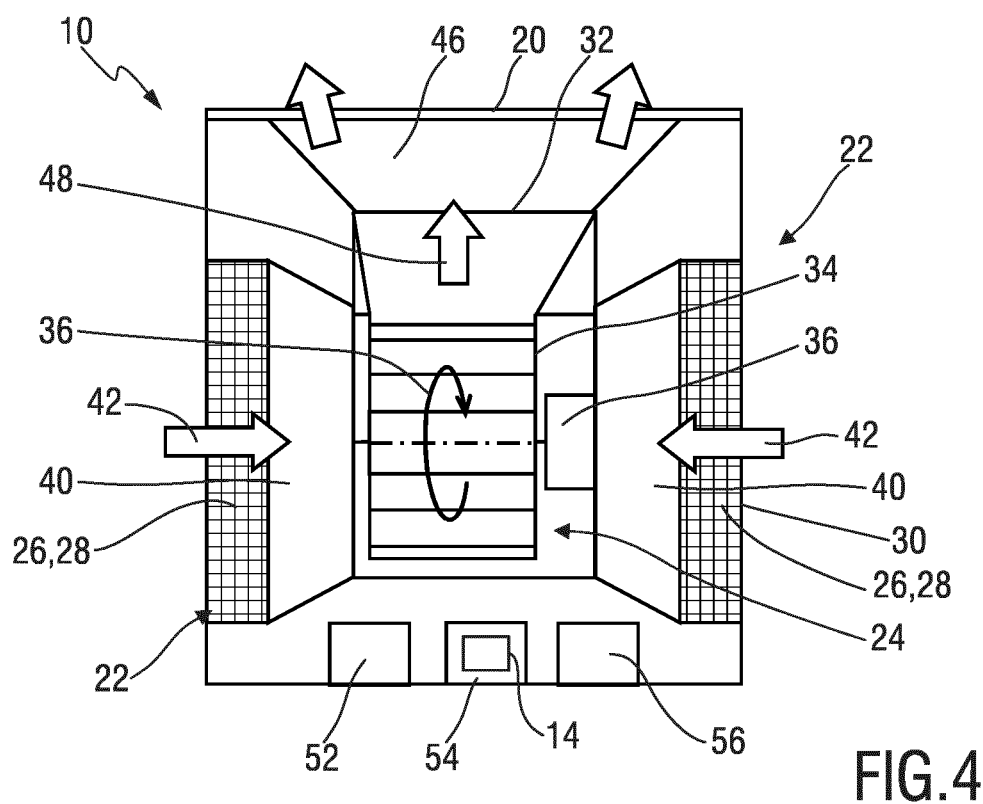
FIG. 4 shows a simplified schematic block representation of internal components of the apparatus in accordance with the arrangement of FIGS. 1 to 3.

Further reference is made to FIG. 4 showing an illustrative block diagram of components of an air treatment apparatus 10 that may be arranged in accordance with the embodiment shown in FIGS. 1, 2 and 3.

As indicated above, the apparatus 10 comprises an air treatment module 22 that is provided with a treatment unit 30 that implements a filter arrangement that involves filters 26, 28. For instance, two opposite sets of filters 26, 28 may be provided at respective lateral ends of the housing 12 of the apparatus 10.

In a central portion of the housing 12, the ventilating unit 24 is arranged. The ventilating unit 24 comprises a ventilator 34 which is powered by a motor 36. An operation of the ventilator 34 is indicated by a curved arrow 36 in FIG. 4. By way of example, the ventilator 34 may be arranged as centrifugal ventilator. Accordingly, the ventilator 34 may be arranged to axially suck in inlet air and to blow out pressurized outlet air in a radial direction. In accordance with the arrangement of FIG. 4, the ventilator 34 is arranged to upwardly blow out pressurized air.

An inlet flow 42 passes a flow inlet 40 of the air treatment module 22 and enters the ventilator 34. The inlet flow 42 passes the respective filters 26, 28.

Preferably, the inlet flow 42 comprises two inlet flow components at opposite axial sides of the ventilator 34 which are associated with the two opposite sets of filters 26, 28, as shown in FIG. 2 and FIG. 4.

At the outlet side of the ventilator 34, an outlet flow 48 escapes radially from the ventilator 34 through a flow outlet 46 of the air treatment module 22 towards the top grille (outlet cover 20). The outlet flow 42 passes the inner cover 32 (refer also to FIG. 3).

Hence, ambient potentially polluted or contaminated air enters the apparatus 10 at lateral sides thereof, wherein purified airs escapes from the apparatus 10 through a top side.

The apparatus 10 further comprises a control device 52 which is indicated in FIG. 4 by a respective control block. Further, a sensor unit 52 is provided that incorporates the at least one sensor 14. In certain embodiments, the apparatus 10 further comprises a communication interface 56, particularly a wireless communication interface. Through the communication interface 56, the appliance 10 may communicate with remote appliances, remote sensors units, a remote service, and/or mobile computing devices involving smart phones, mobile computers, tablets, etc. Needless to say, also remote controls and/or smart home control terminals may be communicatively coupled with the apparatus 10 via the communication interface 56.

Figure 5:
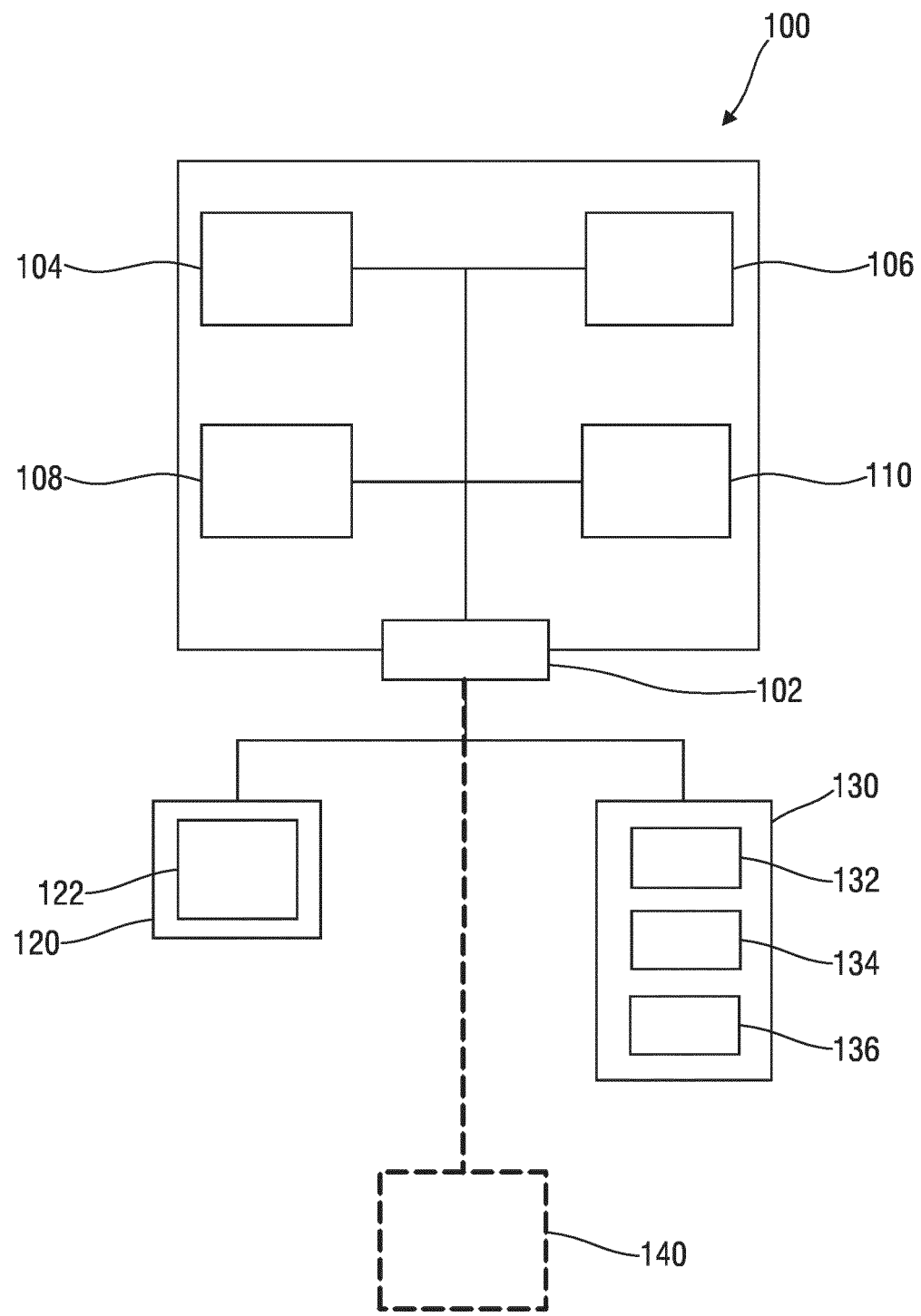
FIG. 5 shows a simplified schematic block representation of an exemplary layout of a control device for an air treatment apparatus.

FIG. 5 shows an exemplary simplified layout of a control device 100 for operating an air treatment apparatus. The control device 100 may be implemented in or coupled to an air treatment apparatus 10 as described further above in connection with FIGS. 1 to 4.

Generally, the control device 100 may be implemented in hardware and/or software. Combined hardware and software implementations may be envisaged. The control device 100 may be provided as a distributed system or an integrated system. Generally, the control device may be incorporated in a top level control of the air treatment apparatus 10. Further, in alternative embodiments, at least some modules of the control device may be represented by remote devices.

In accordance with the exemplary layout as shown in FIG. 5, the control device 100 comprises an interface 102 which is operable as an input. Further, the interface 102 may be operable as an output or a combined input/output interface. Via the interface 102, particle concentration measurements may be gathered and fed to a baseline processing module 104. To this end, the control device 100 may be operatively coupled with a sensor unit 130 which may comprise at least one air quality sensor 132, 134, 136. As indicated in FIG. 5, also a set of sensors 132, 134, 136 may be provided. The sensors 132, 134, 136 may be arranged as distributed sensors of the same type or as sensors of a different type.

Generally, the sensor unit 130 may correspond to the sensor unit 52 that is incorporated in the apparatus 10, refer to FIG. 4, for instance. Further, the control device 100 as shown in FIG. 5 may correspond to or may form part of the control device 52 described further above in connection with FIG. 4.

The baseline processing module 104 is arranged to compute an air quality signal that is primarily based on detected particle concentration measurements.

Further, an obtaining module 106 is provided which is arranged to obtain so-called augmenting information that is directly or mediately indicative or air quality. The obtaining module 106 gathers information that may be used to enrich or augment the air quality index. A major goal of the obtaining module 106 is to provide information that is directly or mediately indicative of an increased allergy risk.

The obtaining module 106 may be arranged to process particle measurements so as to derive augmenting information therefrom. Hence, also the obtaining module 106 may be arranged to process data that is supplied from the sensor unit 130. This may involve that the obtaining module 106 is arranged to further process particle concentration signals.

Further, the control device 100 comprises an air quality index augmenting module 108 that is arranged to compute an augmented air quality index based on the particle concentration measurements and the augmenting information. Hence, the non-augmented air quality index provided by the baseline processing module 104 may be modified in case respective events have been detected by the obtaining module 106. The processed augmented air quality index is generally indicative of an overall particle concentration level, but also of further characteristics and events that are geared towards allergenic pollutants, etc.

As a result, an operation control module 110 of the control device 100 may operate the air treatment apparatus 10 based on the augmented air quality index computed by the air quality index augmenting module 108. Hence, it may for instance be concluded that an increased level of allergens is present or at least likely to be present. In reaction thereto, the air treatment apparatus 10 may be operated in a specific allergen mode.

The control device 100 may further comprise or may be coupled to an output unit 120 that is arranged to display a current air quality index value, particularly an augmented air quality level, which also may include a main air quality state that spans a number a levels. To this end, the output unit 120 may be provided with a display 122, light sources, and/or similar visual indicators.

Further, the control device 100 may be operatively coupled with a motor 140 of a ventilating unit of an air treatment apparatus (motor 140 indicated by dashed lines in FIG. 5). Hence, depending on the set operation mode, a certain ventilator speed or throughput through the apparatus may be generated, so as to operate the apparatus in a load-dependent fashion.

In the following, exemplary aspects and embodiments of the present disclosure will be explained and further detailed. As discussed further above, it is proposed to provide the user of an air treatment apparatus with a so-called air quality index that is based on several measurements and/or related observations. More particularly, it has been observed that particularly for allergy sufferers, the mere level of particle concentration in the ambient air is not the most significant control value for the operation of the air treatment apparatus. It has been further observed that at least for these customers, allergy-related events should have a higher weighting when setting up an appropriate operation mode for the apparatus.

However, as specific allergen sensors are currently not available at reasonable prices and with sufficient accuracy, it has been proposed to obtain information on allergenic pollutants in a mediate fashion.

Further, it has been observed that operating the air treatment apparatus primarily based on a detected $PM_{2.5}$ value is for non-skilled users often problematic. Hence, a more simplified and understandable air quality index has been proposed.

In many air treatment apparatuses that are available, the air quality sensors cannot selectively detect allergens. Allergens may include, for instance, pollen allergens, house dust mite allergens, etc. As a general rule, house dust is relatively likely to contain allergens, and therefore, when the dust is swirled and disturbed, an increased risk of allergens in the air is present.

It is therefore proposed to detect so-called micro events that may for instance include a sudden increase in particles in the air which may indicate a respective disturbance of previously settled dust and therefore an increased risk of allergens in the air. A goal would be to operate the air treatment apparatus in a specific allergen mode so as to protect the user from allergens, at least to a certain extent. It is therefore proposed to establish an air quality index that takes into account a baseline signal and, in addition, a potential risk of allergens in the air, etc.

An indoor allergen risk may be basically represented by two events. First, a high particulate matter level, particularly $PM_{2.5}$ level, is involved. Second, a detection of micro events is involved, which may induce an offset to a baseline level.

Consequently, a better estimate of likelihoods of allergens in the air or high pollution in general may be provided. In either case, the air treatment apparatus may be operated to increase the ventilator/fan speed so as to eventually reduce the risk of contaminants and airborne allergens.

Further, it is proposed to provide a visual air quality index signal which may include respective colors or another easy-to-understand status indication. In the following table, an exemplary listing of main states (involving a color code), air quality levels and corresponding particulate matter concentrations that define a baseline thereof is provided:

| Main air quality state | AQI Level | PM 2.5 Thresholds |
| --- | --- | --- |
| #4 (Red) | 12 | >95 |
|  | 11 | 76-95 |
|  | 10 | 56-75 |
| #3 (Red purple) | 9 | 50-55 |
|  | 8 | 43-49 |
|  | 7 | 36-42 |
| #2 (Blue purple) | 6 | 29-35 |
|  | 5 | 21-28 |
|  | 4 | 13-20 |
| #1 (Blue) | 3 | 9-12 |
|  | 2 | 5-8 |
|  | 1 | 1-4 |

AQI stands for air quality index. In the following table, a respective main state of air quality is assigned to a resulting fan speed, in a standard mode of operation:

| Main air quality state (IAI) | AQI Level | Fan Speed |
| --- | --- | --- |
| #4 (Red) | 10-12 | B |
| #3 (Red purple) | 7-9 | C |
| #2 (Blue purple) | 4-6 | D |
| #1 (Blue) | 1-3 | E |

The fan speed (or throughput, cleaning capacity, etc.) is increased from E to D to C to B. In case of additional effects (detected micro events, etc.) that result in an augmented air quality index, basically the same modus operandi applies as the AQI level and the assigned main stage are updated/modified accordingly.

Figure 6:
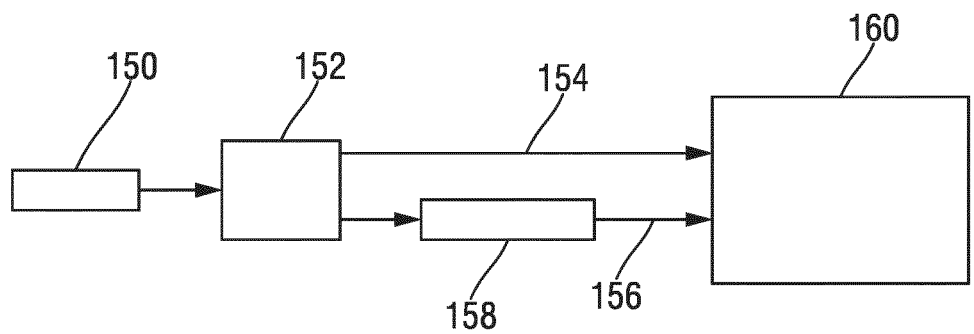
FIG. 6 is a simplified block diagram illustrating an algorithm for the computation of an augmented air quality index.

As already indicated further above, micro events have a further influence on the air quality level. In this context, reference is made to FIG. 6, illustrating a simplified block diagram of an algorithm for establishing an augmented air quality index. A block 150 defines a current particle concentration that can be detected by a sensor 152. By way of example, the sensor 152 is a particulate matter ($PM_{2.5}$) sensor. As indicated by an arrow 154, the particulate matter value detected by the sensor 152 may be used to derive an air quality index.

However, an alternative signal branch is indicated by reference numeral 156. In case so-called micro events are detected, a penalty value or offset may be added to the signal detected by the sensor 152. The detection of micro events is indicated in FIG. 6 by a block 158. The goal of the modification of the signal provided by the sensor 152 is to make the air treatment apparatus more sensitive to potentially allergen-inducing events. A block 160 in FIG. 6 computes and indicates a resulting air quality index, which may be an augmented index in case a penalty value is applied. Based on the index provided in block 160, the air treatment apparatus may be operated so as to reduce the level of pollutants/allergens.

In accordance with the above-described principle, a pseudo particulate matter concentration is used to induce a more sensitive behavior of the air treatment apparatus. In accordance with the above tables, an example for such an adaption of the air quality index is shown in the following:

| Baseline PM2.5 | Baseline AQI | PM2.5 Penalty | New AQI | Main State Change |
| --- | --- | --- | --- | --- |
| 3 | 1 | 25 | 5 | #1 --> #2 |
| 12 | 3 | 25 | 7 | #1 --> #3 |

It is to be noted in this context that the calculation and derivation of the augmented air quality index does not affect the detection of the original baseline air quality index. Hence, the function and operation of the air quality sensor (e.g. $PM_{2.5}$ sensor) is not compromised.

The following table illustrates a further exemplary embodiment in which for a certain time after the adaption of the air quality index, a specific operation mode is present:

| Time | PM 2.5 Penalty | Another Micro-event allowed? |
| --- | --- | --- |
| 0-1 min | + 25 | No |
| 1-2 min | + 20 | No |
| 2-3 min | + 15 | No |
| 3-4 min | + 10 | No |
| 4-5 min | + 5 | No |
| >5 min | + 0 | Yes start from new baseline PM2.5 |

Hence, in a period of about 5 min after the detection of a micro event, a different handling of micro events is proposed. The above example illustrates an option to obtain a stable and manageable air quality index.

In accordance with an exemplary embodiment, it is proposed to condition the detected particulate matter signal. In this context, reference is made to FIG. 7 and FIG. 8.

Figure 7:
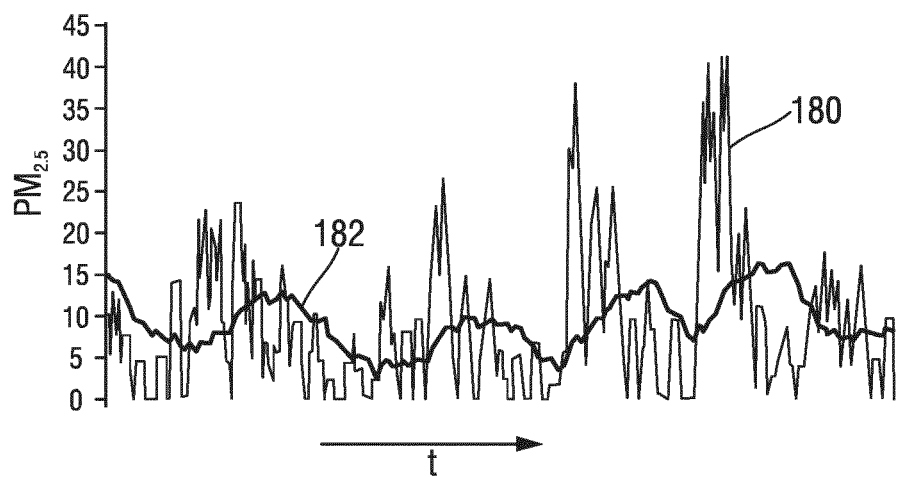
FIG. 7 is a chart illustrating exemplary indoor $PM_{2.5}$ signals having a different average window width.

FIG. 7 contains two signals that are sensed by the same particulate matter sensor. A first chart 180 is present to which a certain averaging time window is applied. Further, a second chart 182 is present to which a different time averaging window is applied. For instance, chart 180 represents a PM$_{2.5}$ signal that is averaged over 32 s (seconds). By contrast, the chart 182 is a PM$_{2.5}$ signal that is averaged over 256 s.

Further, it is to be noted that an averaging period for PM$_{2.5}$ signal based on which the Baseline AQI is determined may be different from the periods indicated above in connection with FIG. 7.

Figure 8:
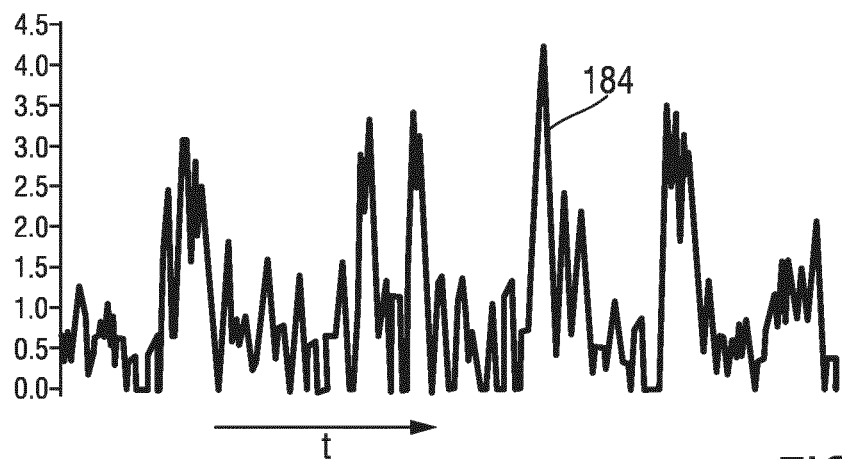
FIG. 8 is a chart illustrating temporal characteristics of a particle concentration indicative signal, wherein the signal of FIG. 8 is based on the signals shown in FIG. 7.

For illustrative purposes, FIG. 8 shows a chart 184 that is basically based on the signals 180, 182 shown in FIG. 7. More explicitly, signal 184 in FIG. 8 is based on a ratio or quotient of signals 180, 182 in FIG. 7:

$$\text{Micro event Detection Value } (DV) = \frac{\text{Average } PM2.5 \text{ value in the last 32 sec}}{\text{Average } PM2.5 \text{ value in the last 256 sec}} \quad (1)$$

In another exemplary embodiment, the numerator (top of the fraction) averaging period is 30 s, wherein the divisor (bottom of the fraction) averaging period is 300 s. Generally, the divisor period is much longer than the numerator period, e.g. approximately eight times to twelve times.

Figure 9:
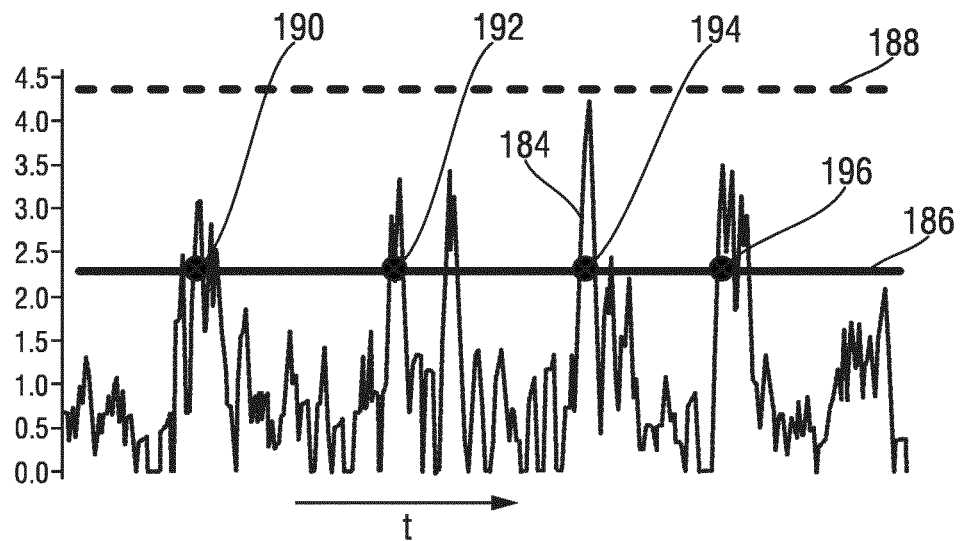
FIG. 9 is a further illustration of the chart of FIG. 8, wherein thresholds for the detection of micro events are illustrated.

Further reference in this context is made to FIG. 9. FIG. 9 basically corresponds to FIG. 8, wherein a threshold 186 and a higher threshold 188 are indicated. Reference numerals 190, 192, 194, 196 indicate micro events, when the signal 184 touches or exceeds the threshold 186.

Threshold 188 is an example for a threshold that is basically too high so as to detect micro events. By contrast, threshold 186 is well chosen as relevant micro events can be detected at a sufficient reliability level.

Figure 10:
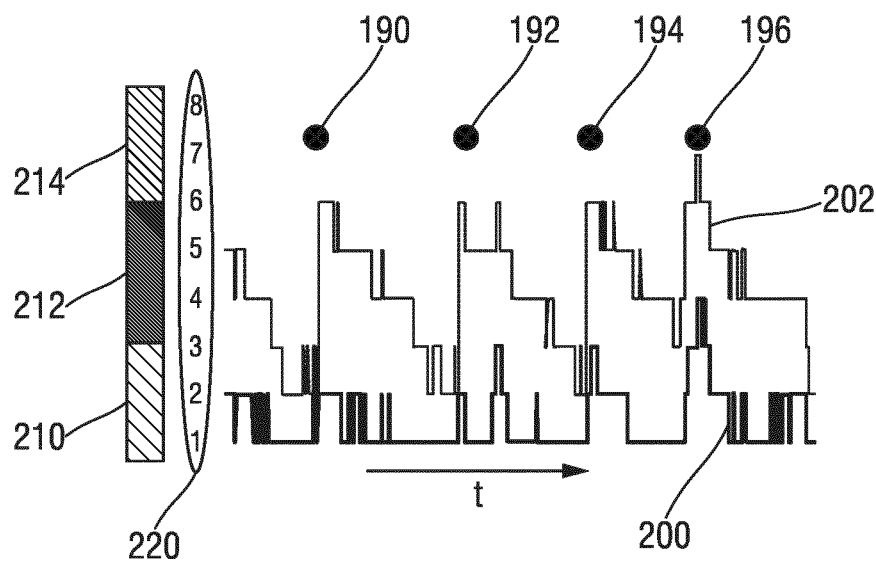
FIG. 10 is a simplified chart illustrating a resulting operation procedure for an air treatment apparatus, the chart involving a comparison of a baseline air quality signal and a modified, augmented air quality signal.

Further reference is made to FIG. 10 which illustrates resulting air quality index signals 200, 202. In FIG. 7, the micro events 190, 192, 194, 196 detected in FIG. 9 are indicated. Signal 200 is a non-augmented air quality index that basically represents to a baseline signal primarily based on measurements detected by the particle concentration/particulate matter sensor 152 in FIG. 6, for instance. Whenever a micro event 190, 192, 194, 196 is detected, an offset may be applied to the signal 200, resulting in an augmented signal for the augmented air quality index 202. As a result, another main air quality state may apply, refer also to the main states 210, 212, 214 in FIG. 10. Further, so-called indoor allergen index values that represent respective finely graduated levels are indicated by reference 220 in FIG. 10.

As further shown in FIG. 10, whenever an offset has been applied to the signal 200 in reaction to the detection of a micro event 190, 192, 194, 196, the offset is gradually reduced over time so as to eventually return the augmented signal 202 to the baseline signal 200.

Figure 11:
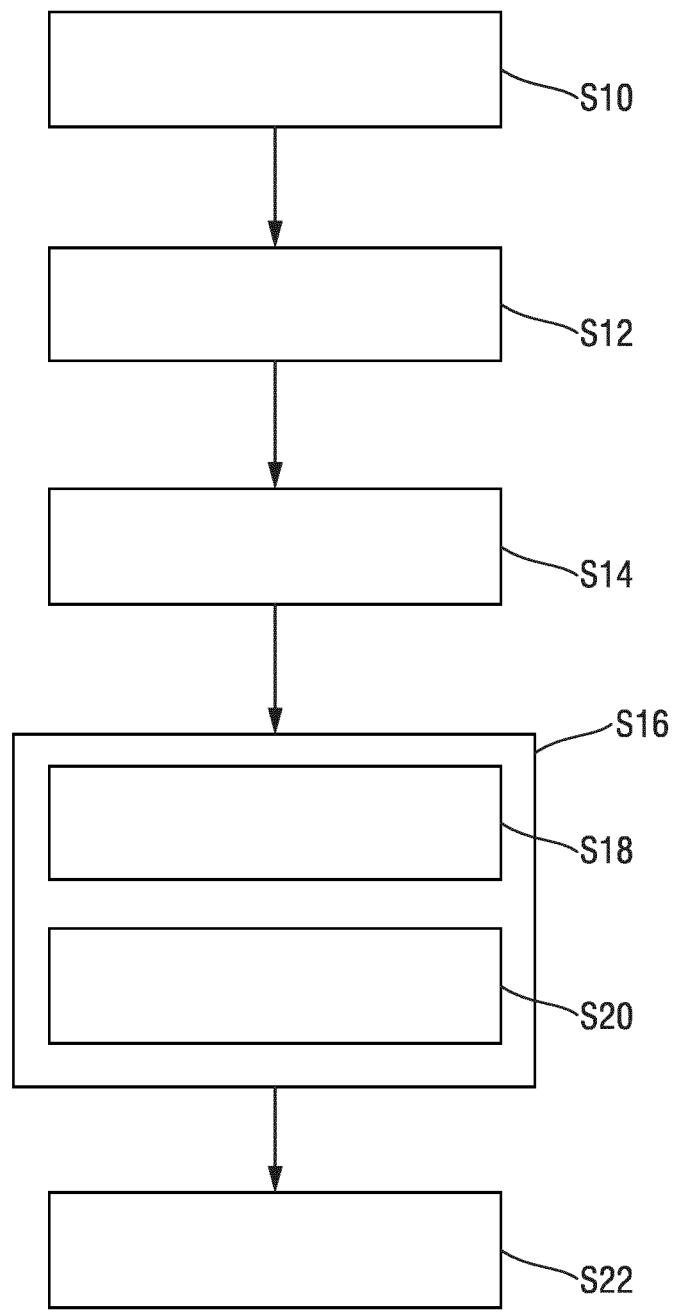
FIG. 11 shows a schematic block diagram exemplary illustrating several steps and aspects of an embodiment of an operating method in accordance with the present disclosure.

Further reference is made to FIG. 11 illustrating, by means of a schematic block diagram, several steps of an exemplary embodiment of a method of operating an air treatment apparatus.

The method includes a step S10 involving the detection of particle concentration, particularly particulate matter (PM) concentration, based on which particle concentration indicative information may be processed. Based on particle concentration measurements, a baseline air quality index may be established in a step S12.

In a further step S14, augmenting information may be obtained which is directly or mediately indicative of air quality. Preferably, the augmenting information is at least potentially indicative of an allergy risk due to increased an allergen level in the ambient air. Augmenting information may be used to enrich and/or augment the baseline air quality index already processed in the step S12.

As a consequence, in a step S16, an augmented air quality index may be determined/computed. The augmented air quality index preferably is based on or derived from the genuine particle concentration measurements (step S10) and the augmenting information obtained in the step S14.

The step S16 may comprise several sub steps S18, S20. In a sub step S18, the adaption or modification of the air quality index involves an offset to the signal which may be regarded as a penalty (pseudo) particle concentration increase. Consequently, the air treatment apparatus may be operated as if an even higher particle concentration than the actual particle concentration detected by the sensor unit was present.

Further, in another sub step S20, for a certain period after the adaption of the air quality index, a special mode operation may be defined. This may involve a special procedure for handling further potentially allergy-risk increasing events. In this way, signal outliers and/or overshoots may be avoided. Further, an offset applied to the air quality index may be gradually reduced in the sub step S20. Hence, after some time the adapted signal returns to a baseline level.

In a further step S22, the air treatment apparatus may be operated based on the augmented air quality index. Hence, in cases when a considerably moderate particle concentration is detected, but, at the same time, potentially allergy-coursing events have been detected, the apparatus may be operated as if a higher particle concentration was present.

Embodiments of devices, systems and methods in accordance with the present disclosure may be used in the context of connected air purifiers to improve the performance of cleaning different types of pollutants, including allergens. Further, aspects and features of the present disclosure also may be incorporated in an air quality sensor box or wearable sensors to provide a better anti-allergen performance of air treatment apparatuses.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A control device for operating an air treatment apparatus, the control device comprising:
   an input arranged to receive measured data from at least one at least one air quality sensor that is indicative of particle concentration;
   a computing device; and a non-transitory storage medium storing instructions that, when executed by the computing device, cause the computing device to:
derive particle concentration indicative information from the received measured data;
compute a baseline air quality index based on the particle concentration indicative information;
obtain augmenting information that is indicative of changes to air quality;
determine an augmented air quality index based on the particle concentration indicative information and the augmenting information; and
operate the air treatment apparatus based on the augmented air quality index.

2. The control device as claimed in claim 1, wherein the particle concentration indicative information includes at least one of particulate matter information or ultrafine particle information, and wherein the augmenting information is used to adapt the baseline air quality index.

3. The control device as claimed in claim 1, wherein the augmenting information is indicative of one or more events indicative of an increased allergy risk.

4. The control device as claimed in claim 1, wherein the augmenting information includes at least one of:
an operating record of the air treatment apparatus, or
an actual operation performance of the air treatment apparatus.

5. The control device as claimed in claim 1, wherein the augmented air quality index is a qualitative index including an air quality index signal having a limited number of discrete values.

6. The control device as claimed in claim 5, wherein a limited number of main air quality states is assigned to the discrete values of the air quality index signal.

7. The control device as claimed in claim 2, wherein adapting the baseline air quality index comprises applying an offset to a particle concentration indicative signal.

8. The control device as claimed in claim 7, wherein the applied offset is gradually reduced after the adapting of the baseline air quality index.

9. The control device as claimed in claim 2, wherein the augmenting information is indicative of an event indicative of an increased allergy risk, and wherein a defined period after the adaption of the baseline air quality index an occurrence of event indicative of an increased allergy risk is differently treated.

10. The control device as claimed in claim 1, wherein determining the augmented air quality index comprises applying a modified artificial particle concentration level, taking into account the augmenting information that is indicative of air quality influencing factors.

11. The control device as claimed in claim 2, wherein the instructions further cause the computing device to process the particle concentration indicative information, including averaging a particle concentration signal based on a first averaging window, averaging the particle concentration signal based on a second averaging window, wherein the first averaging window is smaller than the second averaging window, and calculating a ratio between the first averaged signal and the second averaged signal, resulting in a signal that forms a basis for detection of events that trigger the adapting of the baseline air quality index.

12. A method of operating an air treatment apparatus, the method comprising:
detecting particle concentration using an air quality sensor and deriving particle concentration indicative information from the particle concentration;
computing a baseline air quality index based on the particle concentration indicative information,
obtaining augmenting information that is indicative of air quality;
determining an augmented air quality index based on the particle concentration indicative information and the augmenting information; and
operating the air treatment apparatus based on the augmented air quality index.

13. The method as claimed in claim 12, wherein the particle concentration indicative information includes at least one of particulate matter information or ultrafine particle information, wherein the augmenting information is used to adapt the baseline air quality index.

14. The method as claimed in claim 12, wherein the baseline air quality index is adapted based on the augmenting information, and wherein the adapting includes applying an offset to a particle concentration indicative signal.

15. The control device as claimed in claim 1, wherein the augmenting information includes a temporal change of particle concentration.

16. The method as claimed in claim 13, wherein the augmenting information includes at least one of an operating record of the air treatment apparatus, or an actual operating performance of the air treatment apparatus.

17. The method as claimed in claim 13, wherein the augmenting information includes a temporal change of particle concentration.

18. A non-transitory storage medium that stores instructions for operating an air treatment apparatus, the instructions, when executed by a computing device, causing the computing device to:
derive particle concentration indicative information from a particle concentration detected using an air quality sensor;
compute a baseline air quality index based on the particle concentration indicative information;
obtain augmenting information that is indicative of air quality;
determine an augmented air quality index based on the particle concentration indicative information and the augmenting information; and
operate the air treatment apparatus based on the augmented air quality index.

19. The non-transitory storage medium as claimed in claim 18, wherein the augmenting information is indicative of one or more events indicative of an increased allergy risk.

20. The non-transitory storage medium as claimed in claim 18, wherein the instructions further cause the computing device to adapt the baseline air quality index using the augmenting information by applying an offset to a particle concentration indicative signal, and wherein the applied offset is gradually reduced after the adapting of the baseline air quality index.

* * * * *